(12) United States Patent  
Hannon et al.

(10) Patent No.: US 7,117,545 B2  
(45) Date of Patent: Oct. 10, 2006

(54) LIQUIDPROOF SEAM FOR PROTECTIVE APPAREL

(75) Inventors: Gregory E. Hannon, Newark, DE (US); William G. Hardie, Landenberg, PA (US); Timothy J. Smith, Wilmington, DE (US)

(73) Assignee: Gore Enterprise Holdings Inc., Newark, DE (US)

( * ) Notice: Subject to any disclaimer, the term of this patent is extended or adjusted under 35 U.S.C. 154(b) by 364 days.

(21) Appl. No.: 10/686,248

(22) Filed: Oct. 15, 2003

(65) Prior Publication Data

US 2005/0081281 A1    Apr. 21, 2005

(51) Int. Cl.  
*A41D 27/24* (2006.01)

(52) U.S. Cl. .......................................... 2/275

(58) Field of Classification Search ............... 2/2.15, 2/69, 93, 456–458, 2.11, 85, 2.14, 108, 79, 2/227, 2.16, 69.82, 275, 274; 112/418, 419; 156/91, 93, 73.5; 428/102, 104, 121  
See application file for complete search history.

(56) References Cited

U.S. PATENT DOCUMENTS

| | | | | |
|---|---|---|---|---|
| 2,115,368 | A | * | 4/1938 | Lustberg ..................... 428/57 |
| 3,686,064 | A | * | 8/1972 | Bonnet et al. ............... 442/221 |
| 4,190,010 | A | * | 2/1980 | Bibby ......................... 112/419 |
| 4,194,041 | A | | 3/1980 | Gore et al. |
| 4,276,341 | A | * | 6/1981 | Tanaka ........................ 442/183 |
| 4,599,075 | A | * | 7/1986 | Nygard ........................ 441/103 |
| 5,267,519 | A | * | 12/1993 | Uglene et al. .............. 112/440 |
| 5,631,074 | A | * | 5/1997 | Herlihy, Jr. .................. 442/35 |
| 5,742,936 | A | * | 4/1998 | Tronc ............................ 2/2.15 |
| 6,387,994 | B1 | | 5/2002 | Gore et al. |

FOREIGN PATENT DOCUMENTS

| WO | WO 00/24280 | 5/2000 |
|---|---|---|
| WO | WO 01/26495 | 4/2001 |

* cited by examiner

*Primary Examiner*—Tejash Patel  
(74) *Attorney, Agent, or Firm*—Carol A. Lewis White (57) ABSTRACT

Liquidproof seams are formed between laminates, most preferably those having a complex textile structure on the sealing side of the laminate, where at least a portion of the complex textile in the sealing region is removed, such as by skiving, to reduce the thickness in the seam, or sealing region, prior to the creation of a durably sealed liquidproof seam.

14 Claims, 7 Drawing Sheets

LIQUIDPROOF SEAM FOR PROTECTIVE APPAREL

FIELD OF THE INVENTION

This invention relates to the production of liquidproof protective apparel created from laminates, most preferably those having a complex textile structure on the sealing side of the laminate, where liquidproof seams are created by removal of a portion of the textile, such as by skiving, in the seam, or sealing, region prior to the creation of a durably sealed liquidproof seam.

BACKGROUND OF THE INVENTION

The use of coated textile composites or laminates of textiles and liquid protective barrier membrane layers to create liquidproof protective apparel is well known in the industry. The most common of these applications is waterproof breathable apparel. Typical examples are laminate materials sold by W. L. Gore and Associates, Inc. under the registered trade name GORE-TEX, which contain a waterproof breathable film laminated, or bonded, to one or more textile layers. These laminates are fabricated into apparel and sold as GORE-TEX® garments and the like. Coated textiles can also be used in textile composites for these same purposes. Both coated textiles and protective barrier membrane, or film, laminates will be collectively referred to hereafter as "laminates" solely for convenience of description.

Pieces or panels of these laminates are joined together to form garments and other similar textile structures. For the garments to be liquidproof and protective, there is a need to seal the seams where the panels of laminate are joined together. The joining of these laminate panels is typically done by first sewing the laminates together using conventional sewing techniques. Liquidproof sealing of these sewn seams is then accomplished by the application of a seam seal tape having a thermoplastic hot melt adhesive which seals to the surface of the coating or protective barrier film and creates a seal over the sewing holes and the area where the layers join between the stitches. The seam seal tape may be heated, for example, using a nozzle to direct a stream of hot air so as to melt the adhesive. The tape is then applied over the seam and both are passed through the nip of a pair of pressure rollers in order to squeeze the molten adhesive onto the protective layer surface to ensure good bonding of the tape to the surface. For aesthetic reasons, the seam sealing tape is generally applied to the interior of a garment so that it is hidden from view. Less common sealing techniques such as gluing and welding are also known in the art.

In many applications, it is desirable to use a textile layer on both sides of the protective membrane or coating, either to extend the durability of the protective layer, or to improve the aesthetics and sensorial comfort of the finished apparel. These laminates are referred to as three-layer constructions, or three-layer laminates. For example, very often for reasons of comfort and appearance the liquidproof, breathable laminate is provided with a knitted liner layer (i.e., the layer which faces the wearer), which is somewhat soft to touch and thus, provides improved comfort in contact with the wearer.

Unfortunately, the liner layers which can be used with conventional liquidproof garments are very limited, as problems with creating a durable, liquidproof seal arise when layers with a complex textile structure are used. As used herein, the term "complex textile structure" is intended to refer to textiles with a fiber, or filament, structure (whether mono-filament or multi-filament) having a tortuous path through which adhesives or sealants have limited ability to penetrate to the protective barrier layer and to encapsulate the filaments of the textile layer in order to form a liquidproof seam. For the purposes of this invention, fibers and filaments are considered to be used interchangeably and can include, for example, staple fibers. Complex textile structures can include, for example, wovens, nonwovens, knits, and brushed, fleeced or otherwise napped (i.e, any suitable raised surface) forms thereof. These complex textile structure materials often tend to be bulkier or thicker than conventional liner layers and are more desirable since they tend to be more comfortable to the wearer.

As noted above, the use of textile constructions with three layers, and possibly even more layers in some instances, creates added difficulty in forming a liquidproof seam. Not only does a seal need to reach the protective barrier layer surface, but also the structure of the textile itself needs to be sealed or encapsulated to prevent liquid from wicking or seeping along the textile fibers and exiting beyond the boundary of the liquidproof seam. Thus, the seam sealing of such three-layer fabrics, such as those having a complex textile structure for the inner lining layer, has posed significant problems in the prior art.

A first problem is that while the application of heat and pressure to the seam sealed tape is generally effective to force the molten adhesive through the liner layer into good contact with the underlying membrane layer (thereby filling the spaces between adjacent yarns in the liner material), the seam seal adhesive does not penetrate within the interstices of the yarns themselves. As is known, yarns are made up of multiple filaments etc., which have interstices between adjacent filaments. These interstices provide a path along which liquid can wick or weep from the seam to the inside of the garment. This is depicted in more detail with reference to FIGS. 1 and 2, described below. Thus, liquid water entering into the seam through a gap between the adjacent pieces of material or through holes in the rows of stitching, is able to wick laterally out of the seam through the interstices in the yarns of the liner material itself. Therefore, the seam is not completely liquidproof, particularly under severe weather or challenge conditions.

Figure 1:
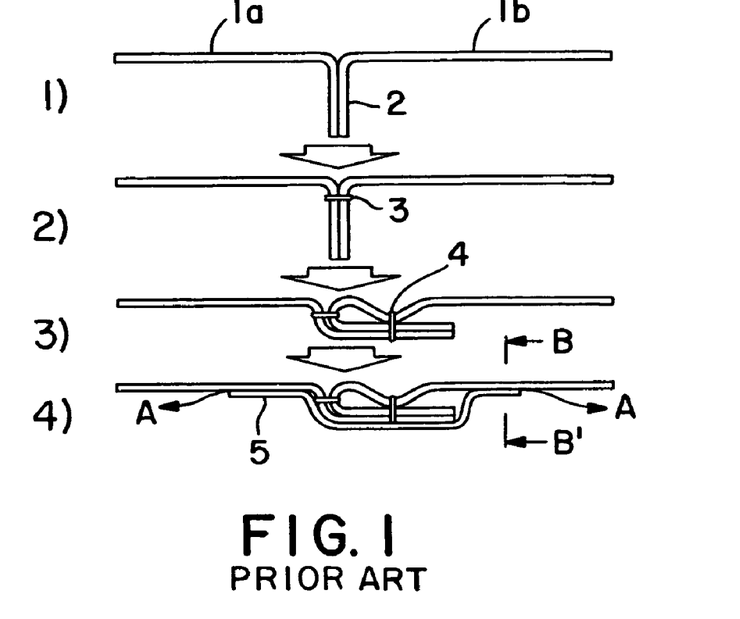
FIG. 1 shows schematically the steps in the formation of one type of conventional seam, which is sealed with seam sealing tape.
Figure 2:
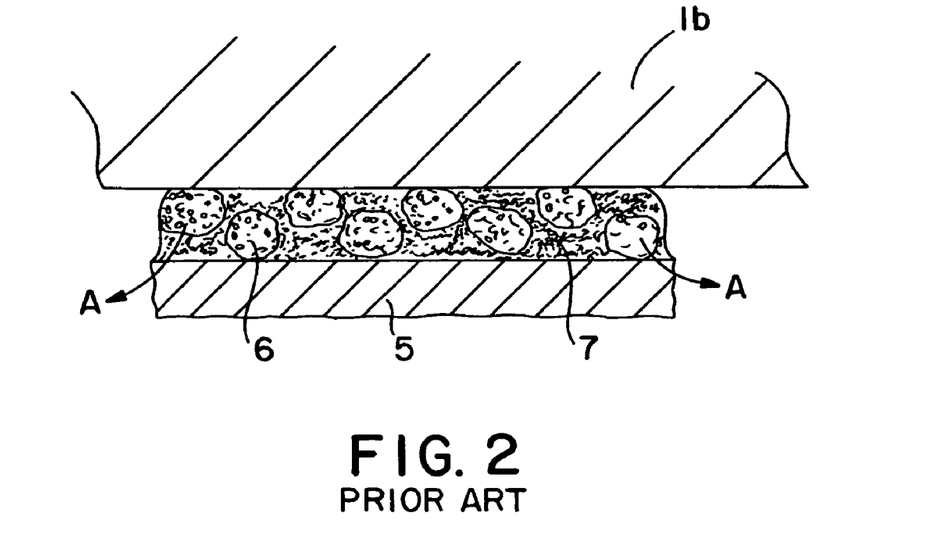
FIG. 2 is an enlarged cross-sectional view along the line B–B' of FIG. 1.

FIGS. 1 and 2 illustrate the problems with conventional seam sealing procedures. FIG. 1 shows a series of steps for forming a conventional seam with the application of seam sealing tape. It is to be understood that the formation of the seam can generally be carried out using conventional sewing machines.

In step 1), two adjacent pieces of material 1a, 1b are overlapped along a seam 2. In a second step 2), the seam is stitched with a row of stitching 3. In a third step 3), the seam is folded over and a further line of stitching 4 is applied so as to form a flattened seam. This seam is not liquidproof, since liquid can ingress through the space between the overlapped pieces of material 1a, 1b. Liquid can also ingress through the holes formed by the stitching 3, 4. For this reason, it is conventional to apply a hot-melt seam sealing tape across the seam such that it seals to the material on either transverse side of the seam. This is shown in step 4), wherein a seam seal tape 5 has been applied across the seam. Seam seal tape is conventionally applied by applying a heated air stream to melt the hot melt adhesive applied to one side of the seam seal tape and pressing the seam seal tape against the seam using pressure rollers, whereby the hot melt adhesive is pressed into the yarns of the fabric such that the seam seal tape becomes securely adhered to the underlying fabric.

As mentioned previously, a problem with this conventional procedure is that the seam seal adhesive, while filling the spaces between adjacent yarns, does not penetrate into the interstices between filaments, etc., within the yarn itself. These interstices provide a route for liquid to wick through the seam in the direction of the arrows A. Thus, liquid enters the seams either between the adjacent pieces of material or through the stitching holes. It is then able to wick out in the direction of the arrows A, particularly under severe weather conditions or liquid challenges.

The problem is illustrated further in FIG. 2, which is a cross-section along line B-B' across the area where the seam seal tape 5 is adhered to material 1b on one side of the seam area. The material 1b includes a liner material laminated thereto composed of individual yarns 6, each yarn is made up of a number of individual filaments, etc. The hot melt adhesive 7 on one side of the seam sealing tape 5 can be seen to have penetrated into the spaces between the yarns 6 but has not penetrated into the interstices between the individual filaments, etc., of the yarns. The pathways for potential liquid ingress A are shown again.

A second problem with the conventional seam sealing process is that the choice of liner layer fabrics which may be seam sealed is currently very limited. One reason for this is that complex textile liner layers require a great deal of heat and pressure to drive the adhesive into the spaces between the liner yarns and to form a strong bond with the underlying protective layer, which is not only time consuming to obtain a reliable seal, but costly as well. In addition, if too much pressure is applied between the seam seal rollers, the pattern of the liner material itself may impress through to the front face of the fabric (i.e., material 1a and 1b) and appear as an undesirable aesthetic. Even at such high pressures, formation of a reliable seam cannot be guaranteed.

In order to overcome these problems, the textiles used for the liner layer, or sealing side, of the laminate have been limited to somewhat open structures, such as relatively simple knits, to allow easy penetration of sealing adhesive. Mono-filament or low-filament count (e.g., 12–13 filament count or less) knits, which have a relatively open structure, are the easiest structures to durably seal for liquidproof apparel and are conventionally used to avoid the challenges of sealing the interstices of more complex multi-filament textiles.

In order to overcome the sealing limitations of textile structures identified above, a great deal of innovation has been directed to developing lower viscosity adhesives that can penetrate and seal complex textile structures. In U.S. Pat. No. 6,387,994, Gore et al. describe the use of solid solvent as a method to lower adhesive viscosity to allow adhesives to penetrate and seal somewhat more complex structures such as brushed knits. In PCT Publication No. WO 01/26495 A1, Dunham et al. describe the use of a liquid thermoset adhesive such as silicone in an effort to seal even more complex or thicker structures. All of these approaches, however, have limitations not only with respect to the thickness and complexity of textile structures that can be sealed, but also in the ease of manufacturing such garments.

In the footwear industry, skiving is a technique used to prepare the edges of two relatively thick and stiff leather pieces to be joined at seams. The skiving reduces the leather thickness for easier joining of the stiff components and helps to prevent thick seams that could rub and be uncomfortable to the wearer. These seams are typically not waterproof. Skiving has also been used to improve the formability of leather in the lasting region, or margin, of the upper to reduce the thickness of leather being turned in a tight radius as would occur during the lasting process of footwear formation when joining the leather upper to the stiff insole board. In some instances in the production of waterproof footwear, a protective lining has been skived in addition to the leather to reduce wrinkling along the lasting margin and to allow attachment of the lining to a waterproof insole board in a waterproof manner. However, such constructions are limited to the production of footwear.

The production of liquidproof and breathable soft shell garments having flexible and durably liquidproof seams is highly desirable and does not exist currently in the apparel industry. A "soft shell" is defined as a laminate with one or more complex textiles, such as a laminate with a woven durable outer textile and a soft, fleece-like or other complex textile lining which provides a sensation of comfort to the wearer. To date, commercially available liquidproof, breathable three-layer laminates and garments have been restricted to brushed knit liner layers of limited complexity and limited thickness to permit adequate liquidproof sealing of the seams; alternatively, garments having fleece liner layers have been sold, but they are not liquidproof at the seam, as it is not possible to seal through the complex textile structures on the inside or outside of the garment.

Apparel incorporating selectively permeable films or impermeable films that are used as chemical barriers for chemical protection or even protection against chemical and biological warfare agents are also subject to the same limitations as liquidproof breathable apparel with liquidproof seams. In these applications it would be especially desirous to use three-layer (or more) laminate structures with complex textile structures to provide additional protection to the barrier layer, such as from puncture or abrasion during use. To date, no such protective apparel with these features exists.

In addition, reversible protective garments incorporating three-layer (or more) laminate structures incorporating complex textiles on both sides would be highly desirable, particularly if the garments could be made with durably liquidproof seams. Current reversible garment constructions made with such textiles are only water-resistant and not available in a truly liquidproof form, as there has been no means to create a durably liquidproof seam with durable, complex textile structures on both sides of a protective laminate. Sealing through the textile structure is even more difficult when both sides are treated with water and stain repellent treatments, such as SCOTCHGARD® coatings from 3M or TEFLON® textile treatments from DuPont, as would be typical in these applications.

Accordingly, a need exists in the apparel industry for a reliable and effective technique for joining two or more panels of a complex textile laminate construction to form a flexible liquidproof seam in protective garments.

Definitions

"Laminate" is a protective film or coating that is coated onto or adhered to at least one layer of textile.

"Protective layer", "barrier layer", "functional layer", or "film" are defined as a film or coating that provides a barrier to liquid water penetration as a minimum, and ideally to a range of liquid chemical challenges. The layer is considered liquidproof if it prevents liquid water penetration against a pressure of at least 0.07 bar for a duration of at least 3 minutes. The protective layer material preferably guarantees a water penetration pressure of more than 0.07 bar. The water penetration pressure is measured on a liquidproof panel based on the same conditions described with respect to the Suter Test for Liquidproof Seams, described herein.

"Seam" is defined as the area where 2 or more pieces of laminate are permanently joined together by sewing, gluing or other mechanical joining.

"Liquidproof seam" is a seam that will not leak or weep liquid when challenged with a test fluid at a pressure of at least 0.07 bar for a duration of at least 3 minutes. The test fluid is at minimum water, and ideally can be a range of liquid chemicals.

"Durably liquidproof seam" is defined as a seam that will not leak or weep fluid when challenged with a test fluid at a pressure of at least 0.07 bar for a duration of 3 minutes after 5 machine wash and dry cycles based on the Test for Durably Liquidproof Seams, described herein. The test fluid is at a minimum water, and ideally can be a range of liquid chemicals.

"Skiving" is defined as the removal of material or textile by cutting, grinding, sanding, abrading or the like from the laminate in the portion of the laminate where a sealed seam will eventually be formed, between two or more protective laminate panels.

SUMMARY OF THE INVENTION

It is a purpose of this invention to provide new and improved liquidproof seams for garments and the like, as well as an improved method for reliably and durably sealing the seams, between two or more laminate panels having a complex textile layer on at least the sealing side of the panels to form liquidproof protective garments and similar flexible textile constructions. The improved seam constructions of the present invention do not suffer from the durability and leakage limitations of conventional garments having complex textile structures. Thus, the present invention provides the capability for producing a new class of protective apparel that has not been possible in the existing art.

The articles of this invention are made by skiving at least a portion of the complex textile material from the sealing area of the laminate panel prior to joining two or more laminate panels by a seam. As used herein, the terms "skive," or "skived," or "skiving" refer to the selective removal of textile material by cutting, grinding, sanding, abrading, or the like.

The skiving may be carried out using any technique, equipment or tool which selectively removes the complex textile material in the desired region or regions of the laminate panel to reduce the thickness of the complex textile layer in at least a portion of the sealing region. In one preferred embodiment, the skiving of the complex textile is accomplished by using a skiving machine which has a cutting blade and a material feed apparatus for orienting the complex textile layer adjacent the cutting blade to remove material. The Fortuna ES-50 skiving machine, available from Fortuna GmbH, is one example of a skiving apparatus particularly suited to selectively remove textile material due to the fine skiving depth adjustment range of the machine.

In a preferred method for producing a garment of the present invention, the pieces of protective laminate are cut into pattern pieces as would be done in normal apparel assembly processes. The sealing regions along, for example, the edges of these cut pieces to be sewn are identified, and these edges are passed through the skiving machine to remove at least a portion of the complex textile material in a desired width. Further, it is possible to remove selected regions of textile material from the interior of the panels so as to form sealing regions for the attachment of pockets, tunnels, hoods, or the like, to the garment, or alternatively, for attaching patches, embroidering logos or other such features. The complex textile is preferably essentially completely removed, but complete removal is not a requirement. It is only necessary to remove a sufficient amount of the complex textile so that the remaining structure is easily sealed through and any remaining filaments can be encapsulated during subsequent sealing steps. Alternative methods of skiving textile material from selected areas, such as by sanding, grinding, shearing and the like, are also within the scope of this invention.

When forming sewn seams between two or more laminate panels, the width of the sealing region on or in the protective laminate panel is typically chosen such that it is wider than the seam allowance required for sewing, thus leaving an open area on each side of the seam allowance after the laminate panels are sewn together. In a preferred method for forming a durably liquidproof seam, a seam sealing tape is then applied to the joined laminate panels. The sealing region (i.e., the skiving width), seam allowance and sealing tape width are selected such that there is at least some width (e.g., preferably 2 mm or more) of open or skived surface on each side of the seam allowance prior to the application of the sealing tape. Upon addition of the sealing tape, the entire sealing region is covered with sealing adhesive, and most preferably, the tape extends slightly beyond the sealing region onto the surface of the remaining un-skived complex textile layer. This configuration is not only the most aesthetically pleasing, but also the durability of these seams is improved when the adhesive restrains the skived edge of the textile layer and the tape is anchored to both the protective film surface and to the laminated textile (i.e., un-skived) surface. In one example of a particularly preferred sealing configuration of the invention, the width of the sealing region beyond the seam allowance is about 4 mm and the amount of sealing tape that extends onto the textile is about 6 mm.

In performing the skiving step, it is preferred to remove as much of the textile as possible in the sealing region, while being careful to not damage the protective layer on the laminate piece to a point where a liquidproof seam cannot be created. This can be accomplished by adjusting the skiving equipment to cut as much textile as is desirable without unnecessarily compromising the integrity of the protective layer. In a most preferred embodiment, the protective layer is undamaged by the skiving.

In an alternative embodiment of the present invention, the skiving can be carried out after the laminate panels have been sewn together. Particularly, a seam can be created between two protective laminate panels, then the skiving step is carried out to reduce the textile material in the sealing region. Care must be take when practicing this method to avoid damaging the seam (e.g., the sewing thread, adhesive bead, or the like), which may result in finished apparel that could be subject to durability issues.

The ability to fabricate protective apparel having complex textile structure layers on both sides of a three—(or more) layer laminate is a highly desirable configuration, especially when the apparel has durably liquidproof seams. For example, in one aspect of the current invention, completely liquidproof garments can be made having a woven protective textile on the exterior of the garment, and a soft insulating fleece on the interior side of the garment and which have liquidproof seams created by skiving away the fleece in the seam area prior to sealing.

The protection of the liquid barrier layer by a complex textile structure on both sides of the barrier also allows the production of reversible garments. In these reversible garments, it is desirable to offer protection against thorns, abrasion, tears and the like on both sides, as during use of the garment both sides will be exposed to such wear hazards. Such reversible garments provide the opportunity for durably liquidproof protective garments in applications heretofore not available. For example, the use of two different camouflage patterns, such as desert tan on one side and forest on the other side, would be desirous for military applications, or alternatively, black on one side for night operations and camouflage on the other for use by special forces. Durably liquidproof protective police garments could be fabricated with, for example, orange or another bright or reflective color on one side and blue (or other standard police uniform color) on the other. Hunting garments could offer different patterns for water fowl and land hunting, as an example. As noted earlier herein, today reversible garments incorporating complex textile structures on both faces of the garment are only water resistant and are not available in a truly liquidproof form.

In another embodiment of this invention, two-layer laminate panels having a complex textile structure on the sealing side can be sealed without sewing by skiving the textile away in the sealing regions of the panels to be joined. The two protective films can then be glued directly to each other to form a seal without having to penetrate and form a seal through the textile itself. A small section of the non-skived textile may be included in the seam area to increase the mechanical strength, but it is not necessary to seal to the non-skived textile portion, as the waterproof seal occurs at the film surface that has been exposed by skiving. This seam allowance would typically be folded over and glued down to reduce stress on the liquidproof joint that has been formed.

DETAILED DESCRIPTION OF THE INVENTION

The present invention provides a new and improved method for reliably and durably sealing the seams between two or more laminate panels having a complex textile construction to form flexible liquidproof protective apparel. The improved seam construction of the present invention does not suffer from the durability and leakage limitations of conventional seams constructed with laminates having complex textile structures. Thus, the present invention provides the capability for producing a new class of protective apparel that has not been possible through the use of the existing art.

Figure 3:
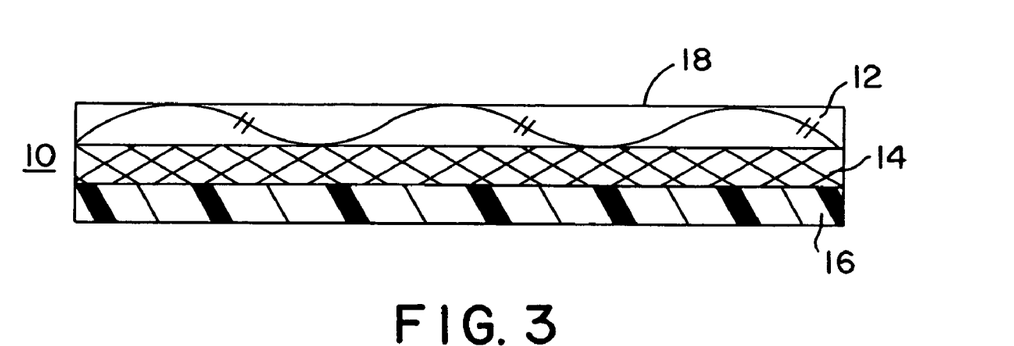
FIG. 3 shows a cross sectional view of a three layer laminate prior to skiving, sewing, or sealing.
Figure 4:
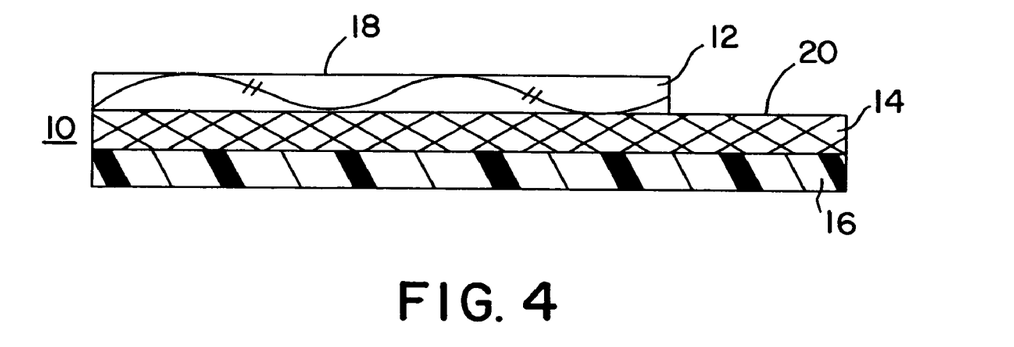
FIG. 4 shows a cross sectional view of a three layer laminate that has been skived, prior to sewing or sealing.
Figure 5:
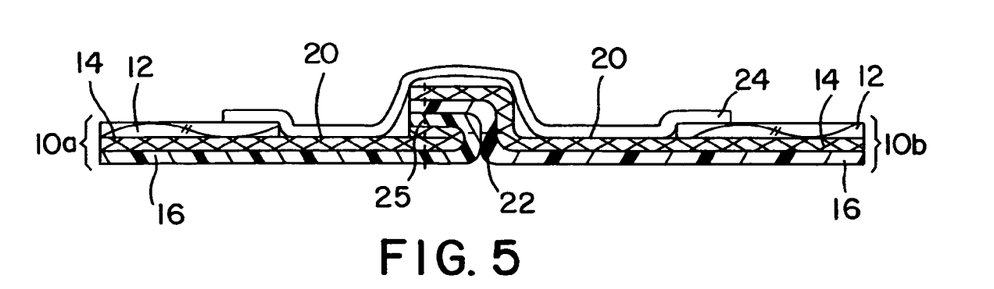
FIG. 5 shows a cross sectional view of a top-stitched simple seam configuration between three layer laminate panels formed by skiving, sewing and sealing with seam tape.

Referring to FIG. 3, there is shown a cross-sectional view of a three layer textile laminate panel 10 having a sealing side 18 for joining the laminate panel to another laminate panel (not shown). The laminate panel 10 includes a complex textile layer 12 on the sealing side 18, a barrier layer 14 and a second textile layer 16, which may or may not comprise a complex textile. FIG. 4 shows the textile laminate panel of FIG. 3 with a portion of the complex textile layer 12 removed by skiving to reveal sealing region 20. Two or more textile laminate panels are then joined in the present invention as shown in cross-section in FIG. 5. Particularly, in the embodiment shown, the two laminate panels 10a and 10b are sewn together with stitches 22 joining the laminate panels together and stitches 25 holding down, or "top-stitching," the seam allowance between the stitches 22 and the edges of the panels 10a and 10b. Seam sealing tape 24 covers and adheres to the joined panel edges and the sealing regions 20 and extends and adheres onto a portion of the complex textile layer 12 beyond the sealing regions 20. With this construction, a durably liquidproof seam can be created where the seam tape 24 is anchored to both the barrier layer 14 in the sealing region 20 and to the complex textile (i.e., un-skived) layer 12.

Figure 6:
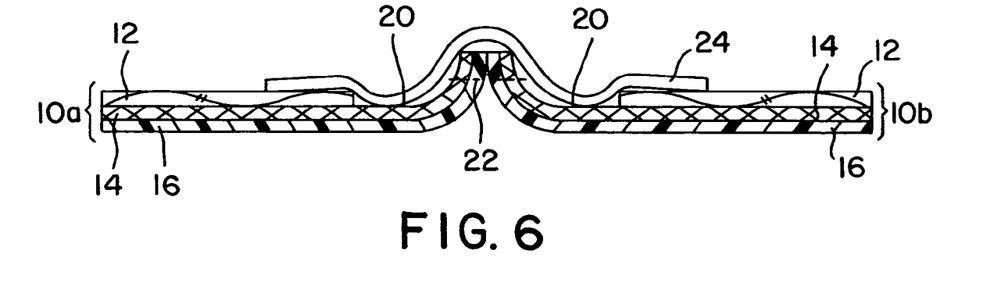
FIG. 6 shows a cross sectional view of another embodiment of a simple seam configuration between three layer laminate panels formed by skiving, sewing and seam taping.

An alternative construction of a durably liquidproof taped seam is shown in FIG. 6, wherein rather than a top-stitched seam, a simple single-stitched seam is incorporated. During the seam taping step, the seam allowance beyond stitches 22 may fall to either panel side, and the sealing regions 20 are provided to be sufficiently wide that the seam tape will adhere to the barrier layer 14 in the sealing region.

Figure 7A:
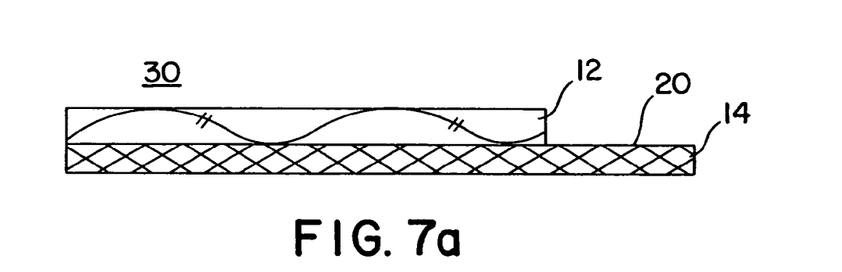
FIG. 7a shows a cross sectional view of a two layer laminate panel where the complex textile structure has been skived to form a sealing region and FIG. 7b shows a finished glued seam between two such two layer laminate panels.
Figure 7B:
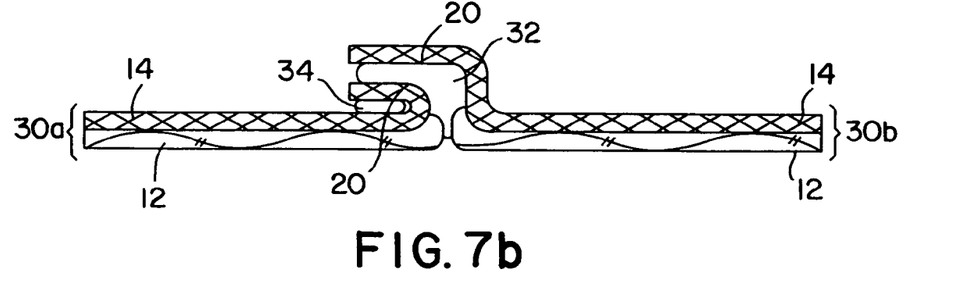

FIGS. 7a and 7b show an alternative embodiment of a two layer construction suitable for creating a liquidproof seal of the present invention. Specifically, FIG. 7a shows a two layer laminate panel 30 with a complex textile layer 12 and a barrier layer 14, with a portion of the complex textile layer 12 removed by skiving to reveal sealing region 20. FIG. 7b shows in cross-section two laminate panels 30a and 30b joined together in the present invention. In this embodiment, an adhesive 32 joins the sealing regions 20 of the two panels together, then the sealed region is folded over and a second adhesive 34 holds the folded portion to the surface of the joined laminate panel structure.

Figure 8:
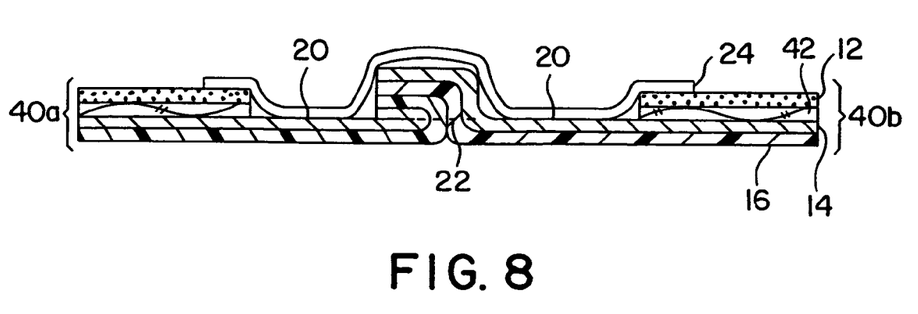
FIG. 8 shows a cross sectional view of a top-stitched simple seam between four layer laminate panels formed by skiving, sewing and sealing with seam tape.

FIG. 8 shows a further alternative embodiment of the invention, wherein multi-layer laminate panels, in this case four layer laminates, are joined. Particularly, the four layer laminate panels 40a and 40b, each comprising complex textile layer 12, barrier layer 14, second textile layer 16 and additional textile layer 42, are sewn together with stitches 22 joining the laminate panels. Seam sealing tape 24 covers and adheres to the joined (stitched) panel edges and the sealing regions 20 and extends and adheres onto a portion of the complex textile layers 12 beyond the sealing regions 20. With this construction, a durable liquidproof seam is created where the seam tape 24 is anchored to both the barrier layer 14 in the sealing region 20 and to the complex textile (i.e., un-skived) layer 12.

Figure 9:
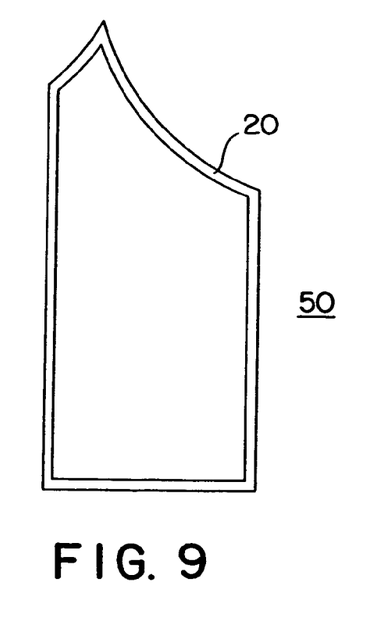
FIG. 9 shows a top perspective view of a laminate panel in the form of a front panel of a jacket, wherein the edges, or sealing regions, of the panel have been skived.
Figure 10:
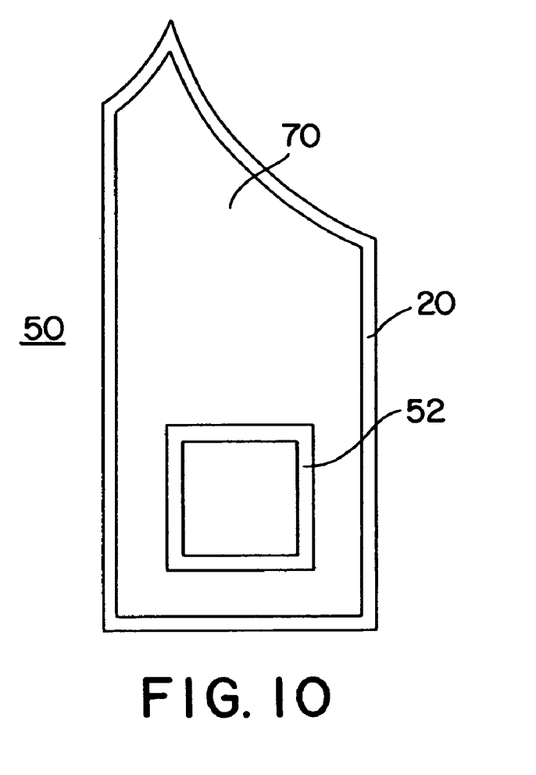
FIG. 10 shows a top perspective view of a laminate panel similar to that of FIG. 9 wherein an additional sealing region has been created in the interior of the panel by skiving.

FIG. 9 is a perspective view of a three layer laminate panel 50 for a front panel of a jacket, wherein the edges, or sealing regions 20, on complex textile face 70 of the panel have been skived in preparation for sealing. FIG. 10 is a perspective view of the laminate panel 50 of FIG. 9 with a further internal sealing region 52 formed by skiving a substantially rectangular geometry which is oriented for adding a pocket to the laminate panel 50 with a liquidproof seam.

Figure 11:
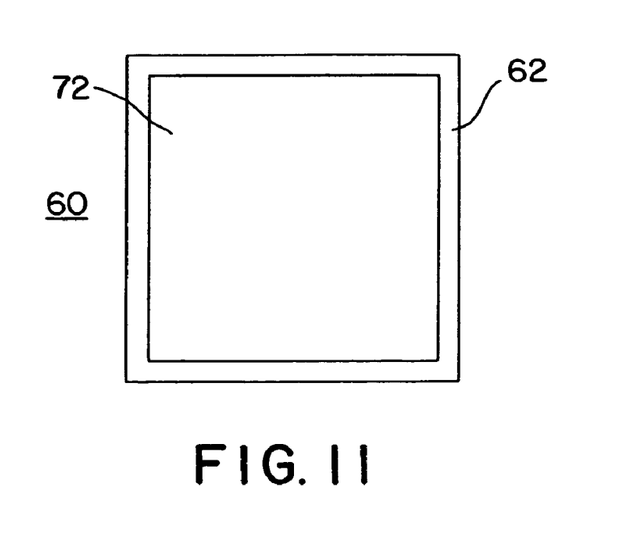
FIG. 11 shows a top perspective view of a laminate panel in the form of a rectangular pocket, wherein the edges, or sealing regions, of the panel have been skived.
Figure 12:
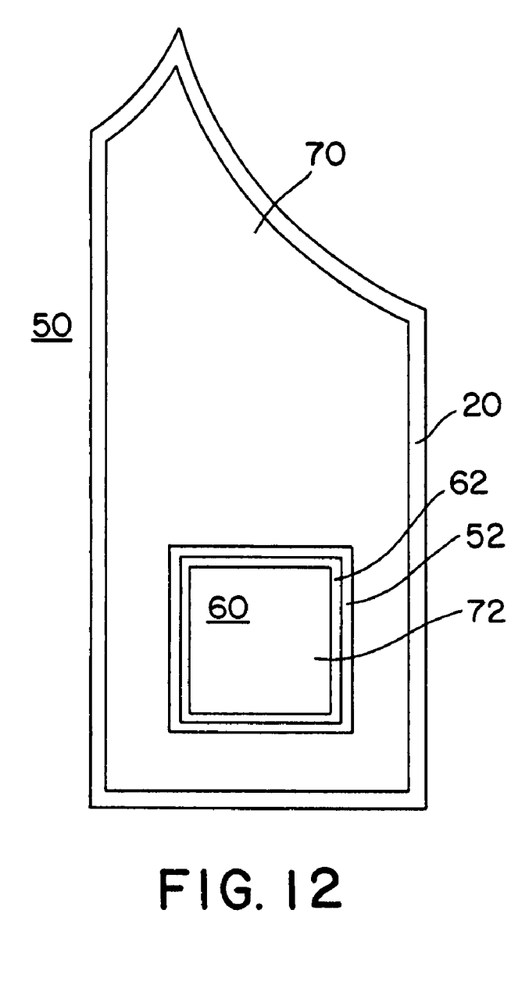
FIG. 12 shows a top perspective view of the laminate panel of FIG. 10 with the pocket panel of FIG. 11 oriented on the laminate panel within the interior sealing region so that the pocket sealing region and the panel internal sealing region are adjacent one another.
Figure 13:
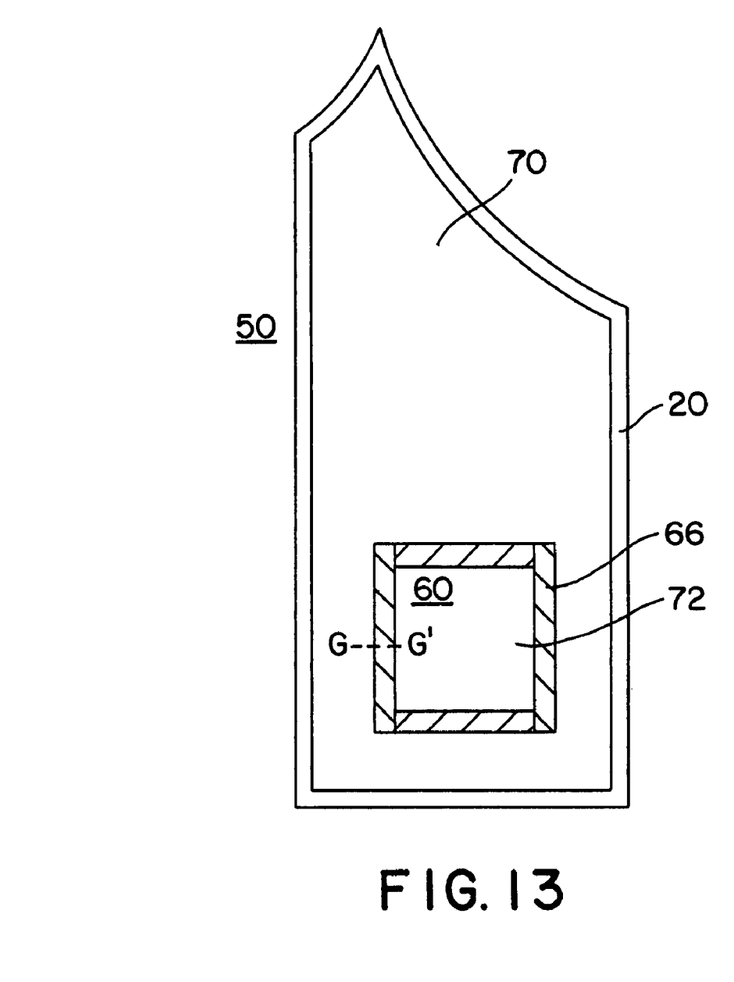
FIG. 13 shows a top perspective view of the combination of FIG. 12, wherein the pocket is sealed to the laminate panel with seam sealing tape.
Figure 14A:
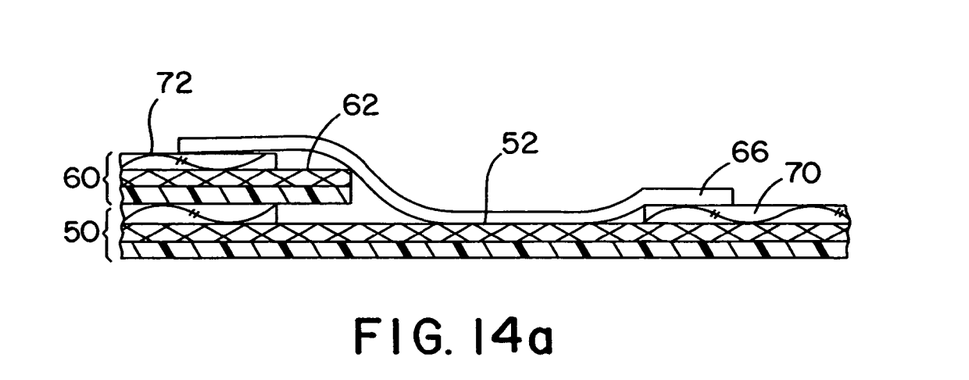
FIGS. 14a and 14b are alternative embodiments of cross-sectional views along the line D–D' of FIG. 13.
Figure 14B:
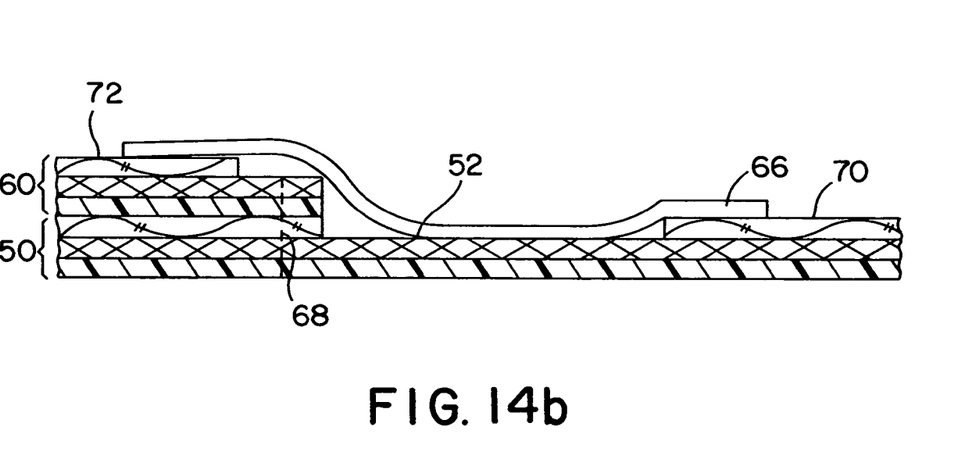

FIG. 11 is a perspective view of a laminate panel 60, which in this embodiment is in the form of a substantially rectangular pocket with the same three layer construction as the jacket panel 50, and sealing region 62 has been created by skiving the outer perimeter of the panel 60 on complex textile face 72. FIG. 12 depicts the jacket panel 50 of FIG. 10 with the pocket panel 60 of FIG. 11 oriented within the internal sealing region 52 so that the pocket sealing region 62 is adjacent the jacket internal sealing region 52, as shown, in preparation for attaching the pocket to the jacket in a liquidproof manner. FIG. 13 depicts the pocket panel 60 joined to the jacket panel 50 with seam tape 66, creating a liquidproof seal between the panels. FIG. 14a is a cross-sectional view of the sealed seam of FIG. 13 along line G–G', wherein the seam tape 66 bridges and seals the sealing region 62 of the pocket panel 60 to the sealing region 52 of the jacket panel 50. In this embodiment, sealing region 62 extends under the pocket panel 60. FIG. 14b is an alternative embodiment of a cross-sectional view of the sealed seam of FIG. 13 along line G–G', wherein the end of the sealing region 62 is substantially flush with the edge of pocket panel 60. Additionally, FIG. 14b depicts an optional stitch line 68. These alternative orientations and configurations are exemplary only, and other such alternatives are also within the scope contemplated for the present invention.

The barrier layer of the laminate may be a protective membrane, film or coating. It may be selected from the group of materials including, but not limited to, polyesters, polyamides, polyketones, polysulphones, polycarbonates, fluoropolymers, polyacrylates, co-polyether esters, co-polyether amides, polyurethanes, polyvinylchloride, polytetrafluoroethylene or polyolefins. For waterproof breathable applications the first layer is preferably, formed from expanded polytetrafluoroethylene (ePTFE). Expanded polytetrafluoroethylene is known to be very waterproof and highly breathable. The ePTFE may be provided with a coating of a hydrophilic polymer in known manner. Such laminates may preferably provide a water-vapour transmission rate of greater than 1500 $g/m^2/day$ (particularly greater than 3000 $g/m^2/day$) and a water entry pressure of greater than 0.07 bar for a period of at least three minutes. For chemical protective application, laminates incorporating impermeable or selectively permeable layers such as GORE CHEM-PAK® fabrics, available from W.L. Gore and Associates, Inc. (Elkton, Md.) would be preferred.

Suitable laminate layers for the sealing side(s) of the apparel of this invention include textiles with a complex textile geometry, as described earlier herein. As noted, textiles with a complex textile structure have a fiber, or filament, structure (whether mono-filament or multi-filament) having a tortuous path through which liquid adhesives have limited ability to penetrate to the protective barrier layer and to encapsulate the filaments of the textile layer in order to form a liquidproof seam. Complex textile structures can include, for example, wovens, nonwovens, knits, and brushed, fleeced or otherwise napped (i.e, any suitable raised surface) forms thereof.

Additional textile layers, whether complex or otherwise, may be suitable on or in the laminates contemplated in the present invention, depending on the requirements of the finished apparel.

Lamination of materials for the novel liquidproof seaming techniques of this invention may be carried out by any suitable conventional lamination techniques. For example, in one technique, a dot pattern of adhesive may be applied onto one or more of the layers to be joined by a gravure roll, and lamination then occurs by passing the materials between the pressure rollers and curing.

In order to produce protective apparel a pattern is used to cut several pieces of protective laminate into panels that will be joined together at seams to form a three dimensional article, with features such as sleeves in a jacket or legs in a pair of pants. Optionally additional features such as hoods and pockets will be included to improve the aesthetics and functionality of the apparel. If the apparel is to be truly protective, it is critical to be able to join these cut panels of laminate together in a manner that the seams or joints where two or more pieces of laminate come together are made liquid proof.

Apparel made from selectively permeable films or impermeable films that are used as chemical barriers for chemical protection or even protection against chemical and biological warfare agents also benefit from the ability to use more complex textiles and form apparel with liquidproof seams. In these applications it is especially desirous to use three layer laminate structures to protect the barrier layer from puncture or abrasion during use.

It will be apparent to one of skill in the art that any suitable laminates may be used in forming the liquidproof seams of the present invention, and that other suitable materials, skiving techniques and sealing steps are also contemplated as within the scope of the present invention. Embodiments of the present invention will now be described by way of example only with reference to the following examples.

Tests

Suter Test for Liquidproof Seams

To determine whether a protective barrier fabric or the seams of a garment made from the protective barrier fabric are waterproof, the Suter test procedure is used, which is based generally on the description in ISO 811-1981. This procedure provides a low pressure challenge to the sample being tested by forcing water against one side of the test sample and observing the other side for indication that water has penetrated through the sample.

The sealed seam test sample is clamped and sealed between rubber gaskets in a fixture that holds the sample so that water can be applied to an area of the sample 3 inches in diameter (7.62 cm). The water is applied under air pressure of 1 psig (0.07 bar) to one side of the sample. In testing a fabric laminate, the water would be applied to the face or exterior side. In testing a sealed seam, water is applied to the face side of the sample and the opposite side, or seam backer layer, is observed for leaks.

The opposite side of the sample is observed visually for any sign of water appearing (either by wicking or the appearance of droplets) at the seam edge for 3 minutes. If no water is observed, the sample has passed the test and the sample is considered liquidproof.

Test for Durably Liquidproof Seams

To determine the durability of a liquidproof seam, the seam sample is washed and dried generally following the conditions outlined in ISO 6330:1984 Procedure No. 3B. Specifically, the sample is loaded in a 4 pound (about 2 Kg) load of laundry into a top loading washing machine set to a medium water level (18 gallons, or equivalently 0.0681 m$^3$), hot water temperature (140° F., or equivalently, 60° C.), warm rinse cycle and heavy duty wash cycle set for 10 minutes, with 90 g of TIDE® powdered laundry detergent. The load is then dried in a rotating dryer on a Hot setting for a 35–45 minute drying time. This wash/dry regimen is repeated five times.

The seam sample is then subjected to the Suter Test for Liquidproof Seams, described above. If no water is observed upon testing, the sample has passed the test and the sample is considered durably liquidproof.

EXAMPLES

Example 1

A liquidproof seam was formed between two laminate panels in the following manner.

A three-layer textile laminate was formed comprising a composite barrier membrane sandwiched between two textile layers. The composite barrier membrane was a composite of microporous polytetrafluoroethylene (PTFE) membrane coated with a polyurethane, prepared according to U.S. Pat. No. 4,194,041 using a water vapor permeable, nonporous polyurethane coating on the ePTFE. This membrane was laminated on one side, using a plurality of dots of moisture cureable polyurethane adhesive, to a Nylon/Spandex woven textile layer approximately 0.4 mm thick and having a weight of approximately 150 grams per square meter. The other side of the membrane was laminated, again using a plurality of dots of moisture cureable polyurethane adhesive, to a polyester fleece textile approximately 0.6 mm thick and having a weight of approximately 170 grams per square meter. Two panels having rough dimensions of about 0.15 m by 0.6 m were then cut from this three-layer textile laminate.

A sealing region of approximately 19 mm width was created along one edge of each laminate panel by removing approximately 0.6 mm of fleece material thickness by skiving. This skiving was accomplished using a Fortuna ES-50 Skiving machine equipped with a Fortuna stone feed roller and curved narrow guide piece (Fortuna Gmbh, Weil der Stadt, Germany).

The laminate panels were then joined at their respective sealing regions by sewing in a straight line, 13 mm from the panel edge, using a Juki sewing machine (Model No. DLN-415-5, Juki Corporation, Tokyo, Japan), set to 5.1 stitches per cm, followed by trimming of 11 mm off the seam allowance to ensure that the edge of the resultant 2 mm seam allowance was at least 4 mm from the edge of the textile in either of the non-sealing regions.

A 22 mm width seam tape (GORE SEAM® seam tape obtained from W.L. Gore and Associates, Elkton, Md.), having a hot melt polyurethane adhesive, was then applied to the sealing region by heating the seam tape to a temperature sufficient to melt the polyurethane adhesive and passing the tape and seam through the nip of a pair of pressure rollers in order to squeeze the molten adhesive onto the protective layer surface so as to ensure good bonding of the tape to the surface. The tape width was such that it covered the entire sealing region and extended about 5 mm beyond the sealing region on each laminate panel. The resulting seam between the two laminate panels was tested using the Suter Test for Liquidproof Seams and determined to be liquidproof based on passage of a 0.07 bar/3 min challenge. The seam was then subjected to the Test for Durably Liquidproof Seams, and after the wash/dry regimen, the sample again passed the 0.07/3 min challenge. As a further evaluation, the sample was then subjected to a more rigorous seam challenge of 3 psi (0.22 bar)/2 min in the Suter test rig, and no water was observed; thus, the sample remained durably liquidproof under the more rigorous conditions.

Example 2

A liquidproof seam was formed between two laminate panels in a manner substantially as described in Example 1, with the following exceptions.

The three-layer textile laminate was formed comprising a composite barrier membrane sandwiched between two textile layers. The membrane was laminated on one side, using a plurality of dots of moisture cureable polyurethane adhesive, to a polyester knitted textile layer of approximately 0.3 mm thickness and having a weight of approximately 85 grams per square meter. The other side of the membrane was laminated, again using a plurality of dots of moisture cureable polyurethane adhesive, to a polyester fleece textile layer approximately 6 mm thick and having a weight of approximately 200 grams per square meter.

A sealing region of approximately 19 mm width was created along one edge of each laminate panel by removal of approximately 6 mm of fleece material thickness by skiving.

A 25 mm width seam tape (GORE SEAM® seam tape obtained from W.L. Gore and Associates, Elkton, Md.), having a hot melt polyurethane adhesive, was then applied to the sealing region by heating the seam tape. The tape width was such that it covered the entire sealing region and extended about 6 mm beyond the sealing region on each laminate panel. The resulting seam between the two laminate panels was tested using the Suter Test for Liquidproof Seams and determined to be liquidproof based on passage of a 0.07 bar/3 min challenge.

Example 3

A liquidproof seam was formed between two laminate panels in a manner substantially as described in Example 1, with the following exceptions.

The laminate was identical to that described in Example 1. However, rather than skiving the fleece side of the three-layer laminate, a sealing region of approximately 19 mm width was created along one edge of each laminate panel by removal of approximately 0.4 mm of the Nylon/Spandex woven material thickness.

The resulting seam between the two laminate panels was tested using the Suter Test for Liquidproof Seams and determined to be liquidproof based on passage of a 0.07 bar/3 min challenge.

Example 4

A laminate panel attachment, sewn to the center of a second laminate panel, which does not compromise the liquidproofness of the second laminate panel, was formed in the following manner. Two laminate panels, identical in composition to those described in Example 1, the first having rough dimensions of about 0.3 m×0.3 m, and the second having dimensions of about 0.1 m×0.1 m were used.

A sealing region of approximately 8 mm width was created along the perimeter of the laminate panel attachment by removal of approximately 0.6 mm of fleece material thickness by skiving. This skiving was accomplished using a Fortuna ES-50 Skiving machine equipped with a Fortuna stone feed roller and curved narrow guide piece (Fortuna Gmbh, Weil der Stadt, Germany). A second sealing region of approximately 25 mm width was created in a square geometry within the main laminate panel by removal of approximately 0.6 mm of fleece material thickness by skiving. This square sealing region was accomplished using the same Fortuna machine with stone feed roller, however, in this case the curved narrow guide piece was removed and the desired region to be skived was run flat along the work table over the cutting blade.

The laminate panels were then joined at their respective sealing regions by sewing using a commercial Juki sewing machine, 5.1 stitches per cm, ensuring that the resultant seam was at least 4 mm from the edge of the fleece in the non-sealing region.

A 25 mm width seam tape (GORE SEAM® seam tape obtained from W.L. Gore and Associates, Elkton, Md.), which includes a hot melt polyurethane adhesive, was then applied to the sealing region by heating the seam tape and passing the tape and seam through the nip of a pair of pressure rollers in order to squeeze the molten adhesive onto the protective layer surface so as to ensure good bonding of the tape to the surface. The tape width was such that it covered the entire sealing region and extended about 6 mm beyond the sealing region on each laminate panel. The resulting laminate panel with attachment was tested using the Suter Test for Liquidproof Seams and determined to be liquidproof based on passage of a 0.07 bar/3 min challenge.

We claim:

1. A seamed article comprising:
   (1) at least two laminate panels, each said laminate panel including
      (a) at least one layer of textile material having a thickness;
      (b) at least one liquidproof barrier layer affixed to the textile material; and
      (c) a sealing region on at least a portion of each laminate panel wherein a portion of the thickness of the textile material is removed, whereby the thickness in at least a portion of the sealing region is less than the thickness of the remainder of the laminate, and
   (2) at least one liquidproof seam joining together the sealing regions of the at least two laminate panels.

2. The seamed article of claim 1, wherein the at least one seam comprises (a) sewn stitches in the sealing region of the laminate panels; and (b) a seam tape covering the sewn stitches and adhered to the laminate panels over the sealing region.

3. The seamed article of claim 1, wherein the at least one seam comprises a welded seam.

4. The seamed article of claim 1, wherein the at least one seam comprises a glued seam.

5. The seamed article of claim 1, wherein said at least one layer of textile material has a construction selected from the group consisting of wovens, nonwovens and knits.

6. The seamed article of claim 5, wherein said at least one layer of textile material further comprises at least one of a brushed, fleeced or napped material.

7. The seamed article of claim 1 wherein said liquidproof barrier layer is selected from the group of materials consisting of polyesters, polyamides, polyketones, polysulphones, polycarbonates, fluoropolymers, polyacrylates, co-polyether esters, co-polyether amides, polyurethanes, polyvinylchloride, polytetrafluoroethylene and polyolefins.

8. The seamed article of claim 1, wherein said liquidproof barrier layer comprises expanded polytetrafluoroethylene.

9. The seamed article of claim 1 in the form of a garment.

10. The seamed article of claim 1, in the form of a jacket.

11. The seamed article of claim 1, wherein said article comprises a soft shell construction.

12. The seamed article of claim 1, wherein said article is a reversible garment.

13. The seamed article of claim 1, wherein said at least one liquidproof seam is durably liquidproof.

14. The article of claim 2, wherein said seam tape extends over and adheres to a portion of the at least two laminate panels beyond the sealing region.

* * * * *